United States Patent
DeHaan et al.

(10) Patent No.: US 8,375,223 B2
(45) Date of Patent: Feb. 12, 2013

(54) SYSTEMS AND METHODS FOR SECURE DISTRIBUTED STORAGE

(75) Inventors: Michael Paul DeHaan, Morrisville, NC (US); Adrian Karstan Likins, Raleigh, NC (US); Seth Kelby Vidal, Morrisville, NC (US)

(73) Assignee: Red Hat, Inc., Raleigh, NC (US)

( * ) Notice: Subject to any disclaimer, the term of this patent is extended or adjusted under 35 U.S.C. 154(b) by 642 days.

(21) Appl. No.: 12/610,081

(22) Filed: Oct. 30, 2009

(65) Prior Publication Data

US 2011/0107103 A1    May 5, 2011

(51) Int. Cl.
*H04L 9/00* (2006.01)
(52) U.S. Cl. ........................................ 713/193
(58) Field of Classification Search .................. None
See application file for complete search history.

(56) References Cited

U.S. PATENT DOCUMENTS

| | | | |
|---|---|---|---|
| 6,118,874 A * | 9/2000 | Okamoto et al. | 380/282 |
| 6,463,457 B1 | 10/2002 | Armentrout et al. | |
| 7,313,796 B2 | 12/2007 | Hamilton et al. | |
| 7,337,331 B2 * | 2/2008 | Yoshida | 713/193 |
| 7,439,937 B2 | 10/2008 | Ben-Shachar et al. | |
| 7,529,785 B1 | 5/2009 | Spertus et al. | |
| 7,546,462 B2 | 6/2009 | Upton | |
| 7,596,620 B1 | 9/2009 | Colton et al. | |
| 8,135,134 B2 * | 3/2012 | Orsini et al. | 380/278 |
| 8,155,322 B2 * | 4/2012 | Bellare et al. | 380/286 |
| 8,180,735 B2 * | 5/2012 | Ansari et al. | 707/640 |
| 2001/0039497 A1 | 11/2001 | Hubbard | |
| 2002/0069276 A1 | 6/2002 | Hino et al. | |
| 2002/0165819 A1 | 11/2002 | McKnight et al. | |
| 2003/0037258 A1 | 2/2003 | Koren | |
| 2003/0110252 A1 | 6/2003 | Yang-Huffman | |
| 2003/0135609 A1 | 7/2003 | Carlson et al. | |
| 2004/0162902 A1 | 8/2004 | Davis | |
| 2004/0210591 A1 | 10/2004 | Hirschfeld et al. | |
| 2004/0210627 A1 | 10/2004 | Kroening | |
| 2004/0268347 A1 | 12/2004 | Knauerhase et al. | |
| 2005/0131898 A1 | 6/2005 | Fatula | |
| 2005/0144060 A1 | 6/2005 | Chen et al. | |
| 2005/0182727 A1 | 8/2005 | Robert et al. | |
| 2005/0289540 A1 | 12/2005 | Nguyen et al. | |
| 2006/0075042 A1 | 4/2006 | Wang et al. | |

(Continued)

OTHER PUBLICATIONS

Krawczyk, "Secret Sharing Made Short", Advances in Cryptology—CRYPTO '93, LNCS 773, pp. 136-146.*

(Continued)

*Primary Examiner* — Minh Dinh
(74) *Attorney, Agent, or Firm* — Lowenstein Sandler LLP

(57) ABSTRACT

Embodiments relate to systems and methods for secure distributed storage. In aspects, a set of remote storage hosts, such as personal computers, servers, media devices, cell phones, or others, can subscribe or register to provide storage via a cloud-based or other distributed network. Source data from an originating computer, such as a data file, can be decomposed into data storage subunits, each of which is encrypted via a cloud management system or other logic or control. The data storage subunits can comprise data blocks or even or uneven size. The set of encrypted data storage subunits can be registered to a table or other record, and disseminated to the remote storage hosts. In the event of data loss at the originating computer or at other times, the remotely stored data storage subunits can be extracted, decrypted, and reassembled to reconstruct the original source data.

16 Claims, 5 Drawing Sheets

U.S. PATENT DOCUMENTS

| | | |
|---|---|---|
| 2006/0085530 A1 | 4/2006 | Garrett |
| 2006/0085824 A1 | 4/2006 | Bruck et al. |
| 2006/0130144 A1 | 6/2006 | Wernicke |
| 2006/0177058 A1 | 8/2006 | Sarwono et al. |
| 2006/0224436 A1 | 10/2006 | Matsumoto et al. |
| 2007/0011291 A1 | 1/2007 | Mi et al. |
| 2007/0028001 A1 | 2/2007 | Phillips et al. |
| 2007/0226715 A1 | 9/2007 | Kimura et al. |
| 2007/0283282 A1 | 12/2007 | Bonfiglio et al. |
| 2007/0294676 A1 | 12/2007 | Mellor et al. |
| 2008/0080396 A1 | 4/2008 | Meijer et al. |
| 2008/0080718 A1 | 4/2008 | Meijer et al. |
| 2008/0082538 A1 | 4/2008 | Meijer et al. |
| 2008/0082601 A1 | 4/2008 | Meijer et al. |
| 2008/0083025 A1 | 4/2008 | Meijer et al. |
| 2008/0083040 A1 | 4/2008 | Dani et al. |
| 2008/0086727 A1 | 4/2008 | Lam et al. |
| 2008/0091613 A1 | 4/2008 | Gates et al. |
| 2008/0104608 A1 | 5/2008 | Hyser et al. |
| 2008/0215796 A1 | 9/2008 | Lam et al. |
| 2008/0240150 A1 | 10/2008 | Dias et al. |
| 2009/0012885 A1 | 1/2009 | Cahn |
| 2009/0025006 A1 | 1/2009 | Waldspurger |
| 2009/0037496 A1 | 2/2009 | Chong et al. |
| 2009/0089078 A1 | 4/2009 | Bursey |
| 2009/0099940 A1 | 4/2009 | Frederick et al. |
| 2009/0132695 A1 | 5/2009 | Surtani et al. |
| 2009/0177514 A1 | 7/2009 | Hudis et al. |
| 2009/0210527 A1 | 8/2009 | Kawato |
| 2009/0210875 A1 | 8/2009 | Bolles et al. |
| 2009/0217267 A1 | 8/2009 | Gebhart et al. |
| 2009/0222805 A1 | 9/2009 | Faus et al. |
| 2009/0228950 A1 | 9/2009 | Reed et al. |
| 2009/0248693 A1 | 10/2009 | Sagar et al. |
| 2009/0249287 A1 | 10/2009 | Patrick |
| 2009/0260007 A1 | 10/2009 | Beaty et al. |
| 2009/0265707 A1 | 10/2009 | Goodman et al. |
| 2009/0271324 A1 | 10/2009 | Jandhyala et al. |
| 2009/0276771 A1 | 11/2009 | Nickolov et al. |
| 2009/0287691 A1 | 11/2009 | Sundaresan et al. |
| 2009/0293056 A1 | 11/2009 | Ferris |
| 2009/0299905 A1 | 12/2009 | Mestha et al. |
| 2009/0299920 A1 | 12/2009 | Ferris et al. |
| 2009/0300057 A1 | 12/2009 | Friedman |
| 2009/0300149 A1 | 12/2009 | Ferris et al. |
| 2009/0300151 A1 | 12/2009 | Friedman et al. |
| 2009/0300152 A1 | 12/2009 | Ferris |
| 2009/0300169 A1 | 12/2009 | Sagar et al. |
| 2009/0300210 A1 | 12/2009 | Ferris |
| 2009/0300423 A1 | 12/2009 | Ferris |
| 2009/0300607 A1 | 12/2009 | Ferris et al. |
| 2009/0300608 A1 | 12/2009 | Ferris |
| 2009/0300635 A1 | 12/2009 | Ferris |
| 2009/0300641 A1 | 12/2009 | Friedman et al. |
| 2009/0300719 A1 | 12/2009 | Ferris |
| 2010/0042720 A1 | 2/2010 | Stienhans et al. |
| 2010/0050172 A1 | 2/2010 | Ferris |
| 2010/0057831 A1 | 3/2010 | Williamson |
| 2010/0058347 A1 | 3/2010 | Smith et al. |
| 2010/0131324 A1 | 5/2010 | Ferris |
| 2010/0131590 A1 | 5/2010 | Coleman et al. |
| 2010/0131624 A1 | 5/2010 | Ferris |
| 2010/0131649 A1 | 5/2010 | Ferris |
| 2010/0131948 A1 | 5/2010 | Ferris |
| 2010/0131949 A1 | 5/2010 | Ferris |
| 2010/0132016 A1 | 5/2010 | Ferris |
| 2010/0169477 A1 | 7/2010 | Stienhans et al. |
| 2010/0220622 A1 | 9/2010 | Wei |
| 2010/0299366 A1 | 11/2010 | Stienhans et al. |
| 2011/0016214 A1 | 1/2011 | Jackson |
| 2011/0131335 A1 | 6/2011 | Spaltro et al. |

OTHER PUBLICATIONS

Morgan, "Systems and Methods for Generating Optimized Resource Consumption Periods for Multiple Users on Combined Basis", U.S. Appl. No. 13/037,359, filed Mar. 1, 2011.

Morgan, "Systems and Methods for Metering Cloud Resource Consumption Using Multiple Hierarchical Subscription Periods", U.S. Appl. No. 13/037,360, filed Mar. 1, 2011.

Morgan, "Systems and Methods for Generating Marketplace Brokerage Exchange of Excess Subscribed Resources Using Dynamic Subscription Periods", U.S. Appl. No. 13/037,351, filed Feb. 28, 2011.

"rBuilder and the rPath Appliance Platform", 2007 rPath, Inc., www.rpath.com, 3 pages.

White Paper—"Best Practices for Building Virtual Appliances", 2008 rPath, inc., www.rpath.com, 6 pages.

DeHaan et al., "Methods and Systems for Flexible Cloud Management with Power Management Support", U.S. Appl. No. 12/473,987, filed May 28, 2009.

Ferris, "Methods and Systems for Providing a Market for User-Controlled Resources to be Provided to a Cloud Computing Environment", U.S. Appl. No. 12/390,617, filed Feb. 23, 2009.

Ferris, "Methods and Systems for Communicating with Third Party Resources in a Cloud Computing Environment", U.S. Appl. No. 12/390,598, filed Feb. 23, 2009.

Ferris, "Systems and Methods for Extending Security Platforms to Cloud-Based Networks", U.S. Appl. No. 12/391,802, filed Feb. 24, 2009.

DeHaan et al., "Methods and Systems for Flexible Cloud Management", U.S. Appl. No. 12/473,041, fled May 27, 2009.

DeHaan et al., "Systems and Methods for Power Management in Managed Network Having Hardware-Based and Virtual Reources", U.S. Appl. No. 12/475,448, filed May 29, 2009.

Ferris, "Methods and Systems for Providing a Universal Marketplace for Resources for Delivery to a Cloud Computing Environment", U.S. Appl. No. 12/475,228, filed May 29, 2009.

DeHaan, "Methods and Systems for Abstracting Cloud Management", U.S. Appl. No. 12/474,113, filed May 28, 2009.

DeHaan, "Methods and Systems for Automated Scaling of Cloud Computing Systems", U.S. Appl. No. 12/474,707, filed May 29, 2009.

DeHaan, "Methods and Systems for Securely Terminating Processes in a Cloud Computing Environment", U.S. Appl. No. 12/550,157, filed Aug. 28, 2009.

DeHaan et al., "Methods and Systems for Flexible Cloud Management Including External Clouds", U.S. Appl. No. 12/551,506, filed Aug. 31, 2009.

DeHaan, "Methods and Systems for Abstracting Cloud Management to Allow Communication Between Independently Controlled Clouds", U.S. Appl. No. 12/551,096, filed Aug. 31, 2009.

DeHaan, "Methods and Systems for Automated Migration of Cloud Processes to External Clouds", U.S. Appl. No. 12/551,459, filed Aug. 31, 2009.

Ferris et al., "Methods and Systems for Pricing Software Infrastructure for a Cloud Computing Environment", U.S. Appl. No. 12/551,517, filed Aug. 31, 2009.

Ferris et al., "Methods and Systems for Metering Software infrastructure in a Cloud Computing Environment", U.S. Appl. No. 12/551,514, filed Aug. 31, 2009.

Ferris et al., "Methods and Systems for Monitoring Cloud Computing Environment", U.S. Appl. No. 12/627,764, filed Nov. 30, 2009.

Ferris et al., "Methods and Systems for Detecting Events in Cloud Computing Environments and Performing Actions Upon Occurrence of the Events", U.S. Appl. No. 12/627,646, filed Nov. 30, 2009.

Ferris at al., "Methods and Systems for Verifying Software License Compliance in Cloud Computing Environments", U.S. Appl. No. 12/627,643, filed Nov. 30, 2009.

Ferris et al., "Systems and Methods for Service Aggregation Using Graduated Service Levels in a Cloud Network", U.S. Appl. No. 12/628,112, filed Nov. 30, 2009.

Ferris et al., "Methods and Systems for Generating a Software License Knowledge Base for Verifying Software License Compliance in Cloud Computing Environments", U.S. Appl. No. 12/628,156, filed Nov. 30, 2009.

Ferris et al., "Methods and Systems for Converting Standard Software Licenses for Use in Cloud Computing Environments", U.S. Appl. No. 12/714,099, filed Feb. 26, 2010.

Ferris et al., "Systems and Methods for Managing a Software Subscription in a Cloud Network", U.S. Appl. No. 12/714,096, filed Feb. 26, 2010.

Ferris et al., "Methods and Systems for Providing Deployment Architectures in Cloud Computing Environments", U.S. Appl. No. 12/714,427, filed Feb. 26, 2010.

Ferris et al., "Methods and Systems for Matching Resource Requests with Cloud Computing Environments", U.S. Appl. No. 12/714,113, filed Feb. 26, 2010.

Ferris et al., "Systems and Methods for Generating Cross-Cloud Computing Appliances", U.S. Appl. No. 12/714,315, filed Feb. 26, 2010.

Ferris et al., "Systems and Methods for Cloud-Based Brokerage Exchange of Software Entitlements", U.S. Appl. No. 12/714,302, filed Feb. 26, 2010.

Ferris et al., "Methods and Systems for Offering Additional License Terms During Conversion of Standard Software Licenses for Use in Cloud Computing Environments", U.S. Appl. No. 12/714,065, filed Feb. 26, 2010.

Ferris et al., "Systems and Methods for or a Usage Manager for Cross-Cloud Appliances", U.S. Appl. No. 12/714,334, filed Feb. 26, 2010.

Ferris et al., "Systems and Methods for Delivery of User-Controlled Resources in Cloud Environments Via A Resource Specification Language Wrapper", U.S. Appl. No. 12/790,294, filed May 28, 2010.

Ferris et al., "Systems and Methods for Managing Multi-Level Service Level Agreements in Cloud-Based Networks", U.S. Appl. No. 12/789,660, filed May 28, 2010.

Ferris et al., "Methods and Systems far Generating Cross-Mapping of Vendor Software in a Cloud Computing Environment", U.S. Appl. No. 12/790,527, filed May 28, 2010.

Ferris et al., "Methods and Systems for Cloud Deployment Analysis Featuring Relative Cloud Resource Importance", U.S. Appl. No. 12/790,366, filed May 28, 2010.

Ferris et al., "Systems and Methods for Generating Customized Build Options for Cloud Deployment Matching Usage Profile Against Cloud Infrastructure Options", U.S. Appl. No. 12/789,701, filed May 28, 2010.

Ferris at al., "Systems and Methods for Exporting Usage History Data as Input to a Management Platform of a Target Cloud-Based Network", U.S. Appl. No. 12/790,415, filed May 28, 2010.

Ferris et al., "Systems and Methods for Cross-Vendor Mapping Service in Cloud Networks", U.S. Appl. No. 12/790,162, filed May 28, 2010.

Ferris et al., "Systems and Methods for Cross-Cloud Vendor Mapping Service in a Dynamic Cloud Marketplace", U.S. Appl. No. 12/790,229, filed May 28, 2010.

Ferris et al., "Systems and Methods for Aggregate Monitoring of Utilization Data for Vendor Products in Cloud Networks", U.S. Appl. No. 12/790,039, filed May 28, 2010.

Morgan, "Systems and Methods for Detecting Resource Consumption Events Over Sliding Intervals in Cloud-Based Network", U.S. Appl. No. 13/149,236, filed May 31, 2011.

Morgan, "Systems and Methods for Triggering Workload Movement Based on Policy Stack Having Multiple Selectable Inputs", U.S. Appl. No. 13/149,418, filed May 31, 2011.

Morgan, "Systems and Methods for Cloud Deployment Engine for Selective Workload Migration or Federation Based on Workload Conditions", U.S. Appl. No. 13/117,937, filed May 27, 2011.

Morgan, "Systems and Methods for Tracking Cloud Installation information Using Cloud-Aware Kernel of Operating System", U.S. Appl. No. 13/149,750, filed May 31, 2011.

Morgan, "Systems and Methods for Introspective Application Reporting to Facilitate Virtual Machine Movement Between Cloud Hosts", U.S. Appl. No. 13/118,009, filed May 27, 2011.

Morgan, "Systems and Methods for Self-Moving Operating System Installation in Cloud-Based Network", U.S. Appl. No. 13/149,877, filed May 31, 2011.

Ferris, et al., "Systems and Methods for Cominatorial Optimization of Multiple Resources Across a Set of Cloud-Based Networks", U.S. Appl. No. 12/953,718, filed Nov. 24, 2010.

Ferris et al., "Systems and Methods for Matching a Usage History to a New Cloud", U.S. Appl. No. 12/953,757, filed Nov. 24, 2010.

Ferris et al., "Systems and Methods for Identifying Usage Histories for Producing Optimized Cloud Utilization", U.S. Appl. No. 12/952,930, filed Nov. 23, 2010.

Ferris et al., "Systems and Methods for Identifying Service Dependencies in a Cloud Deployment", U.S. Appl. No. 12/952,857, filed Nov. 23, 2010.

Ferris et al., "Systems and Methods for Migrating Subscribed Services in a Cloud Deployment", U.S. Appl. No. 12/955,277, filed Nov. 29, 2010.

Ferris et al., "Systems and Methods for Migrating Subscribed Services from a Set of Clouds to a Second Set of Clouds", U.S. Appl. No. 12/957,281, filed Nov. 30, 2010.

Morgan, "Systems and Methods for Generating Multi-Cloud Incremental Billing Capture and Administration", U.S. Appl. No. 12/954,323, filed Nov. 24, 2010.

Morgan, "Systems and Methods for Aggregating Marginal Subscription Offsets in a Set of Multiple Host Clouds", U.S. Appl. No. 12/954,400, filed Nov. 24, 2010.

Morgan, "Systems and Methods for Generating Dynamically Configurable Subscription Parameters for Temporary Migration of Predictive User Workloads in Cloud Network", U.S. Appl. No. 12/954,378, filed Nov. 24, 2010.

Morgan, "Systems and Methods for Managing Subscribed Resource Limits in Cloud Network Using Variable or Instantaneous Consumption Tracking Periods", U.S. Appl. No. 12/954,352, filed Nov. 24, 2010.

Ferris et al., "Systems and Methods for Migrating Software Modules into One or More Clouds", U.S. Appl. No. 12/952,701, filed Nov. 23, 2010.

Ferris et al., "Systems and Methods for Brokering Optimized Resource Supply Costs in Host Cloud-Based Network Using Predictive Workloads", U.S. Appl. No. 12/957,274, filed Nov. 30, 2010.

Ferris et al., "Systems and Methods for Reclassifying Virtual Machines to Target Virtual Machines or Appliances Based on Code Analysis in a Cloud Environment", U.S. Appl. No. 12/957,267, filed Nov. 30, 2010.

* cited by examiner

SYSTEMS AND METHODS FOR SECURE DISTRIBUTED STORAGE

FIELD

The present teachings relate to systems and methods for secure distributed storage, and more particularly to platforms and techniques for receiving data for storage in a cloud-based or other distributed network, in which remote client machines supporting the cloud-based or other network can receive pieces of files or other data objects in secure format from a source machine, store that data locally, and transmit that data back to the original source machine for backup, data reconstruction, or other purposes.

BACKGROUND

Platforms for redundant data storage are known. For instance, storage such as RAID (redundant array of inexpensive disks) servers, disaster recovery storage sites, and other storage or services are available which create and store an image of a file, disk or other storage object to permit a user to access and recover data when original or source data becomes compromised or unavailable, such as, for example, a transaction server with an associated database crashes, or other events occur.

In other regards, cloud-based computing networks have become more prevalent for purposes of deploying virtual machines, networks, storage, and other resources or services. It may be possible to generate data storage or data backup using existing cloud-based network infrastructures. However, existing cloud-based or other distributed networks may not permit a user wishing to perform data backups and/or data recovery to break the data being backed up into smaller storage subunits, and disseminate those data fragments to various remote storage hosts in a cloud-based or otherwise distributed network. Existing data backup platforms likewise may not permit distributed storage to a set of diverse hosts on a secure basis. It may be desirable to provide systems and methods for secure distributed storage, in which a file or other data object can be decomposed into small storage subunits, encrypted or otherwise secured, and distributed to cloud-based or other remote storage hosts, for data recovery or other purposes.

DESCRIPTION OF THE DRAWINGS

The accompanying drawings, which are incorporated in and constitute a part of this specification, illustrate embodiments of the present teachings and together with the description, serve to explain the principles of the present teachings. In the figures.

Figure 1:
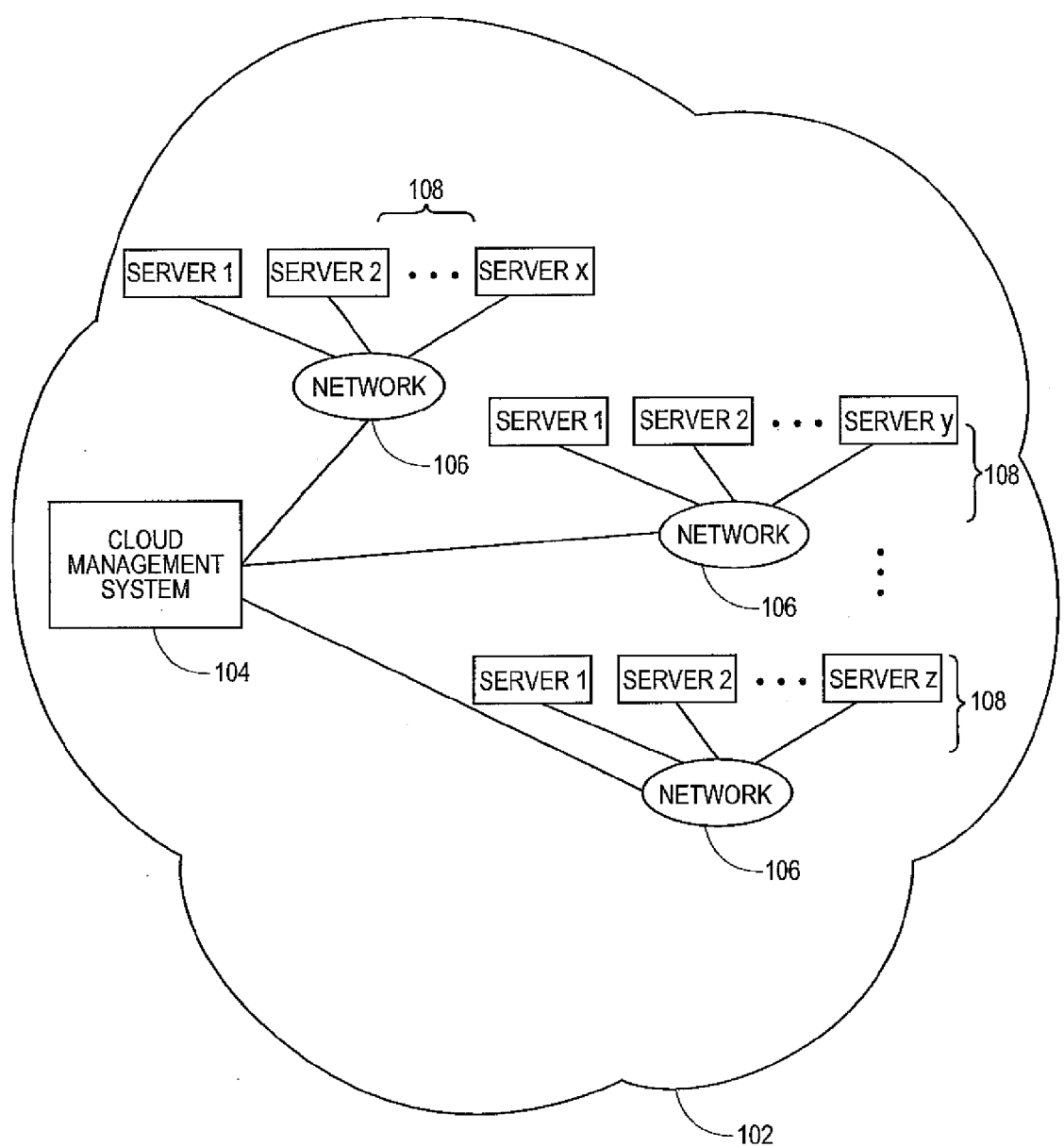
FIG. 1 illustrates an overall cloud system architecture in which various embodiments of the present teachings can be practiced.

Embodiments of systems and methods for secure distributed storage described herein can be implemented in, or supported by, a cloud network architecture. As used herein, a "cloud" can comprise a collection of resources that can be invoked to instantiate a virtual machine, process, or other resource for a limited or defined duration. As shown for example in FIG. 1, the collection of resources supporting a cloud 102 can comprise a set of resource servers 108 configured to deliver computing components needed to instantiate a virtual machine, process, or other resource. For example, one group of resource servers can host and serve an operating system or components thereof to deliver to and instantiate a virtual machine. Another group of resource servers can accept requests to host computing cycles or processor time, to supply a defined level of processing power for a virtual machine. A further group of resource servers can host and serve applications to load on an instantiation of a virtual machine, such as an email client, a browser application, a messaging application, or other applications or software. Other types of resource servers are possible.

In embodiments, the entire set of resource servers 108 or other hardware or software resources used to support the cloud 102 along with its instantiated virtual machines is managed by a cloud management system 104. The cloud management system 104 can comprise a dedicated or centralized server and/or other software, hardware, and network tools that communicate via network 106 such as the Internet or other public or private network with all sets of resource servers to manage the cloud 102 and its operation. To instantiate a new set of virtual machines, a user can transmit an instantiation request to the cloud management system 104 for the particular type of virtual machine they wish to invoke for their intended application. A user can for instance make a request to instantiate a set of virtual machines configured for email, messaging or other applications from the cloud 102. The request can be received and processed by the cloud management system 104, which identifies the type of virtual machine, process, or other resource being requested. The cloud management system 104 can then identify the collection of resources necessary to instantiate that machine or resource. In embodiments, the set of instantiated virtual machines or other resources can for example comprise virtual transaction servers used to support Web storefronts, or other transaction sites.

In embodiments, the user's instantiation request can specify a variety of parameters defining the operation of the set of virtual machines to be invoked. The instantiation request, for example, can specify a defined period of time for which the instantiated machine or process is needed. The period of time can be, for example, an hour, a day, or other increment of time. In embodiments, the user's instantiation request can specify the instantiation of a set of virtual machines or processes on a task basis, rather than for a predetermined amount of time. For instance, a user could request resources until a software update is completed. The user's instantiation request can specify other parameters that define the configuration and operation of the set of virtual machines or other instantiated resources. For example, the request can specify an amount of processing power or input/output (I/O) throughput the user wishes to be available to each instance of the virtual machine or other resource. In embodiments, the requesting user can for instance specify a service level agreement (SLA) acceptable for their application. Other parameters and settings can be used. One skilled in the art will realize that the user's request can likewise include combinations of the foregoing exemplary parameters, and others.

When the request to instantiate a set of virtual machines or other resources has been received and the necessary resources to build that machine or resource have been identified, the cloud management system 104 can communicate with one or more set of resource servers 108 to locate resources to supply the required components. The cloud management system 104 can select providers from the diverse set of resource servers 108 to assemble the various components needed to build the requested set of virtual machines or other resources. It may be noted that in some embodiments, permanent storage such as hard disk arrays may not be included or located within the set of resource servers 108 available to the cloud management system 104, since the set of instantiated virtual machines or other resources may be intended to operate on a purely transient or temporary basis. In embodiments, other hardware, software or other resources not strictly located or hosted in the cloud can be leveraged as needed. For example, other software services that are provided outside of the cloud 102 and hosted by third parties can be invoked by in-cloud virtual machines. For further example, other non-cloud hardware and/or storage services can be utilized as an extension to the cloud 102, either on an on-demand or subscribed or decided basis.

With the resource requirements identified, the cloud management system 104 can extract and build the set of virtual machines or other resources on a dynamic or on-demand basis. For example, one set of resource servers 108 may respond to an instantiation request for a given quantity of processor cycles with an offer to deliver that computational power immediately and guaranteed for the next hour. A further set of resource servers 108 can offer to immediately supply communication bandwidth, for example on a guaranteed minimum or best-efforts basis. In other embodiments, the set of virtual machines or other resources can be built on a batch basis or at a particular future time. For example, a set of resource servers 108 may respond to a request for instantiation at a programmed time with an offer to deliver the specified quantity of processor cycles within a specific amount of time, such as the next 12 hours.

The cloud management system 104 can select group of servers in the set of resource servers 108 that match or best match the instantiation request for each component needed to build the virtual machine or other resource. The cloud management system 104 can then coordinate the integration of the completed group of servers from the set of resource servers 108, to build and launch the requested set of virtual machines or other resources. The cloud management system 104 can track the combined group of servers selected from the set of resource servers 108, or other distributed resources that are dynamically or temporarily combined, to produce and manage the requested virtual machine population or other resources.

In embodiments, the cloud management system 104 can generate a resource aggregation table that identifies the various sets of resource servers that will be used to supply the components of the virtual machine or process. The sets of resource servers can be identified by unique identifiers such as, for instance, Internet protocol (IP) addresses or other addresses. The cloud management system 104 can register the finalized group of servers in the set resource servers 108 contributing to an instantiated machine or process.

The cloud management system 104 can then set up and launch the initiation process for the virtual machines, processes, or other resources to be delivered from the cloud. The cloud management system 104 can for instance transmit an instantiation command or instruction to the registered group of servers in set of resource servers 108. The cloud management system 104 can receive a confirmation message back from each participating server in set of resource servers 108 indicating a status regarding the provisioning of their respective resources. Various sets of resource servers may confirm, for example, the availability of a dedicated amount of processor cycles, amounts of electronic memory, communications bandwidth, or applications or other software prepared to be served.

Figure 2:
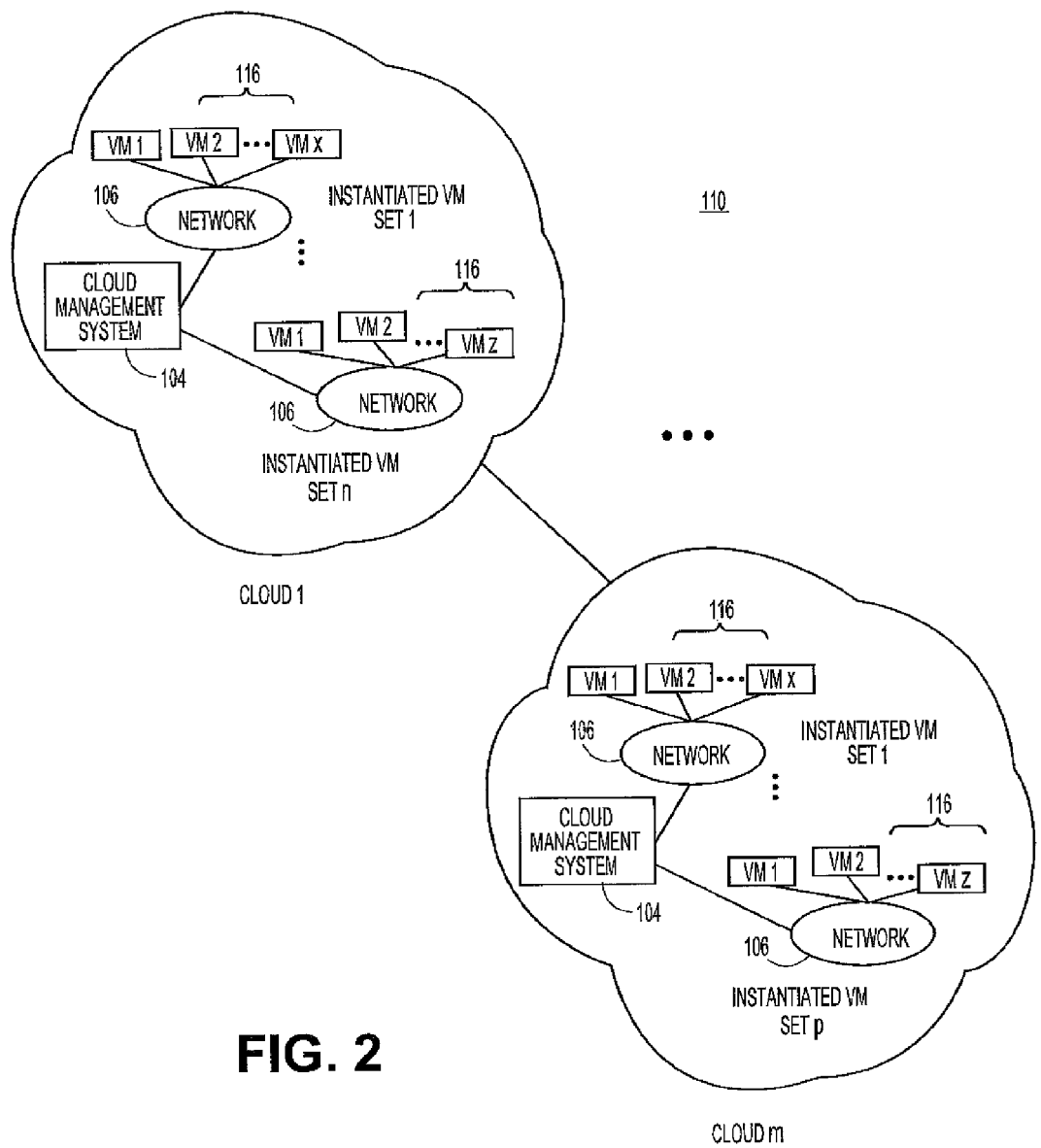
FIG. 2 illustrates an overall cloud system architecture including multiple cloud arrangements in which various embodiments of the present teachings can be practiced in another regard, according to various embodiments.

As shown for example in FIG. 2, the cloud management system 104 can then instantiate one or more than one set of virtual machines 116, or other processes based on the resources supplied by the registered set of resource servers 108. In embodiments, the cloud management system 104 can instantiate a given number, for example, 10, 500, 1000, or other numbers of virtual machines to be made available to users on a network 114, such as the Internet or other public or private network. Each virtual machine can be assigned an instantiated machine ID that can be stored in the resource aggregation table, or other record or image of the instantiated population. Additionally, the cloud management system 104 can store the duration of each virtual machine and the collection of resources utilized by the complete set of instantiated virtual machines 116.

In embodiments, the cloud management system 104 can further store, track and manage a user's identity and associated set of rights or entitlements to software, hardware, and other resources. Each user that populates a set of virtual machines in the cloud can have specific rights and resources assigned and made available to them. The cloud management system 104 can track and configure specific actions that a user can perform, such as provision a set of virtual machines with software applications or other resources, configure a set of virtual machines to desired specifications, submit jobs to the set of virtual machines or other host, manage other users of the set of instantiated virtual machines 116 or other resources, and other privileges or actions. The cloud management system 104 can further generate records of the usage of instantiated virtual machines to permit tracking, billing, and auditing of the services consumed by the user. In embodiments, the cloud management system 104 can for example meter the usage and/or duration of the set of instantiated virtual machines 116, to generate subscription billing records for a user that has launched those machines. Other billing or value arrangements are possible.

The cloud management system 104 can configure each virtual machine to be made available to users of the network 114 via a browser interface, or other interface or mechanism. Each instantiated virtual machine can communicate with the cloud management system 104 and the underlying registered set of resource servers 108 via a standard Web application programming interface (API), or via other calls or interfaces. The set of instantiated virtual machines 116 can likewise communicate with each other, as well as other sites, servers, locations, and resources available via the Internet or other public or private networks, whether within a given cloud 102 or between clouds.

It may be noted that while a browser interface or other front-end can be used to view and operate the set of instantiated virtual machines 116 from a client or terminal, the processing, memory, communications, storage, and other hardware as well as software resources required to be combined to build the virtual machines or other resources are all hosted remotely in the cloud 102. In embodiments, the set of virtual machines 116 or other resources may not depend on or require the user's own on-premise hardware or other resources. In embodiments, a user can therefore request and instantiate a set of virtual machines or other resources on a purely off-premise basis, for instance to build and launch a virtual storefront or other application.

Because the cloud management system 104 in one regard specifies, builds, operates and manages the set of instantiated virtual machines 116 on a logical level, the user can request and receive different sets of virtual machines and other resources on a real-time or near real-time basis, without a need to specify or install any particular hardware. The user's set of instantiated machines 116, processes, or other resources can be scaled up or down immediately or virtually immediately on an on-demand basis, if desired. In embodiments, the various sets of resource servers that are accessed by the cloud management system 104 to support a set of instantiated virtual machines 116 or processes can change or be substituted, over time. The type and operating characteristics of the set of instantiated virtual machines 116 can nevertheless remain constant or virtually constant, since instances are assembled from abstracted resources that can be selected and maintained from diverse sources based on uniform specifications.

In terms of network management of the set of virtual machines 116 that have been successfully configured and instantiated, the cloud management system 104 can perform various network management tasks including security, maintenance, and metering for billing or subscription purposes. The cloud management system 104 of a given cloud can 102, for example, install or terminate applications or appliances on individual machines. The cloud management system 104 can monitor operating virtual machines to detect any virus or other rogue process on individual machines, and for instance terminate the infected application or virtual machine. The cloud management system 104 can likewise manage an entire set of instantiated clients 116 or other resources on a collective basis, for instance, to push or delivery a software upgrade to all active virtual machines. Other management processes are possible.

In embodiments, more than one set of virtual machines can be instantiated in a given cloud at the same, overlapping or successive times. The cloud management system 104 can, in such implementations, build, launch and manage multiple sets of virtual machines based on the same or different underlying set of resource servers 108, with populations of different instantiated virtual machines 116 such as may be requested by different users. The cloud management system 104 can institute and enforce security protocols in a cloud 102 hosting multiple sets of virtual machines. Each of the individual sets of virtual machines can be hosted in a respective partition or sub-cloud of the resources of the main cloud 102. The cloud management system 104 of a cloud can for example deploy services specific to isolated or defined sub-clouds, or isolate individual workloads/processes within the cloud to a specific sub-cloud. The subdivision of the cloud 102 into distinct transient sub-clouds or other sub-components which have assured security and isolation features can assist in establishing a multiple user or multi-tenant cloud arrangement. In a multiple user scenario, each of the multiple users can use the cloud platform as a common utility while retaining the assurance that their information is secure from other users of the overall cloud system. In further embodiments, sub-clouds can nevertheless be configured to share resources, if desired.

In embodiments, and as also shown in FIG. 2, the set of instantiated virtual machines 116 generated in a first cloud 102 can also interact with a set of instantiated virtual machines or processes generated in a second, third or further cloud 102. The cloud management system 104 of a first cloud 102 can interface with the cloud management system 104 of a second cloud 102, to coordinate those domains and operate the clouds and/or virtual machines or processes on a combined basis. The cloud management system 104 of a given cloud 102 can track and manage individual virtual machines or other resources instantiated in that cloud, as well as the set of instantiated virtual machines or other resources in other clouds.

In the foregoing and other embodiments, the user making an instantiation request or otherwise accessing or utilizing the cloud network can be a person, customer, subscriber, administrator, corporation, organization, or other entity. In embodiments, the user can be or include another virtual machine, application or process. In further embodiments, multiple users or entities can share the use of a set of virtual machines or other resources.

Figure 3:
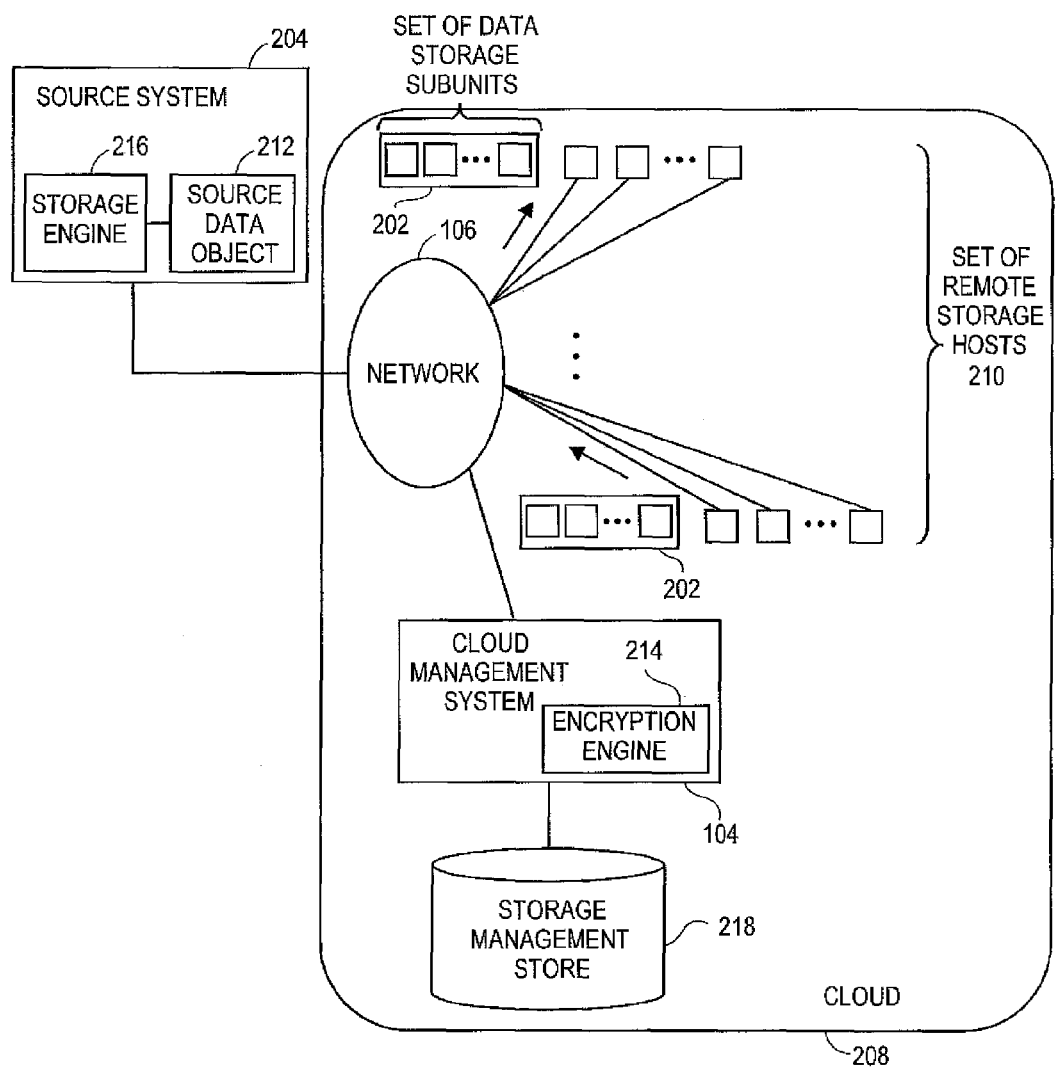
FIG. 3 illustrates a network configuration in which a cloud management system can perform various storage, data processing, and recovery functions, according to various embodiments.

FIG. 3 illustrates an exemplary network incorporating cloud-based resources and other elements that can be used to generate a secure distributed backup of a source data object 212, according to various embodiments. In embodiments as shown, a source machine 204 such as a client, server, host, target, or other machine or device can host or access a source data object 212. In aspects, source data object 212 can be or include a set of data such as, for instance, a data file for use by an application, application code or files, operating system code or files, and/or other information. Source machine 204 can likewise host, access, or execute a storage engine 216 to control data access, communications, and/or other activity to generate a secure backup of source data object 212 via cloud 102 and/or associated resources. More particularly, in embodiments as shown, source machine 204 can communicate with a set of remote storage hosts 210 via one or more networks 106, along with cloud 102 and associated resources. Set of remote storage hosts 210 can be or include host clients, targets, and/or other machines which can be registered by individual and/or home users, or others, via cloud management system 104 or other network management logic to contribute or dedicate some or all of the resources of the participating machine to cloud 102 for data storage and recover purposes. In embodiments, individual machines in set of remote storage hosts 210 can be or include desktop computers, laptop computers, media playback devices, cellular telephones or other network-enabled communications devices, and/or other devices, machines, or hardware. In embodiments, individual machines in set of remote storage hosts 210 can assign or subscribe storage resources, such as hard disk storage, electronic memory or storage, optical storage, and/or other storage media to data backup, storage, and recovery operations.

In embodiments as shown, when data storage and/or backup operations are desired, source system 214 can transmit one or more source data object 212 to cloud management system 104 or other management logic. In embodiments, source system 204 can host a storage engine 216, which can comprise software and/or logic to access source data object 212, and transmit that object to cloud management system 104 via one or more networks 106, for instance using TCP/IP (transfer control protocol/Internet protocol) or other formats or connections. Cloud management system 104 or other logic can receive source data object 212, and divide, partition, or otherwise decompose source data object 212 into a set of data storage subunits 202. Set of storage subunits 202 can, for instance, be or include files, datagrams, or other data objects of comparatively small size for distribution to remote cloud-based or distributed hosts. In embodiments, set of data storage subunits 202 can be of equal size, or unequal size, for instance, to accommodate available storage in different hosts.

Could management system 104 can encrypt or otherwise secure set of data storage subunits 202, for instance, using an encryption engine 214 to apply public/private key security or infrastructure to those data pieces. When secured, cloud management system 104 can transmit one or more data units in set of data storage subunits 202 to corresponding hosts in set of remote storage hosts 210, such as remote personal computers, laptops, workstations, media playback devices, or other storage resources. In embodiments, set of remote storage hosts 210 can subscribe and participate in cloud 102 to offer hard disk, electronic, optical or other storage resources via cloud management system 104, using resource-sharing mechanisms described herein. In embodiments, it will also be noted that set of remote storage hosts 210 can also or instead contribute hard disk, electronic, optical or other storage via other logic, such as a network management server, or on a peer-to-peer or other basis.

Source data object 212 can thereby be accessed, decomposed, secured and distributed to set of remote storage hosts 210 for data backup, recovery, mirroring, and/or other purposes. In aspects, cloud management system 104 can record the assignment of individual data subunits to recipient hosts, for instance in a lookup table or other record. Upon the occurrence of a data recovery event or at other times, source system 204 can request the retrieval and reconstruction of source data object 212 via cloud management system 104 or other logic. For example, source system 204 can detect data corruption or data loss in its copy of source data object 212, for instance on an incorporated hard disk. Source system 204 can then transmit a data recovery request or command to cloud management system 104 or other destination. In response, cloud management system 104 or other logic can access and retrieve set of data storage subunits 210 from set of remote storage hosts 210 via one or more networks 106, and/or other channels. After collecting set of data storage subunits from those hosts, cloud management system 104 or other logic can decrypt set of data storage subunits 104, and reconstruct source data object 212 from those constituent data pieces. After reassembly, cloud management system 104 can transmit the recovered source data object 212 to source system 204 and/or other desired destination.

Figure 4:
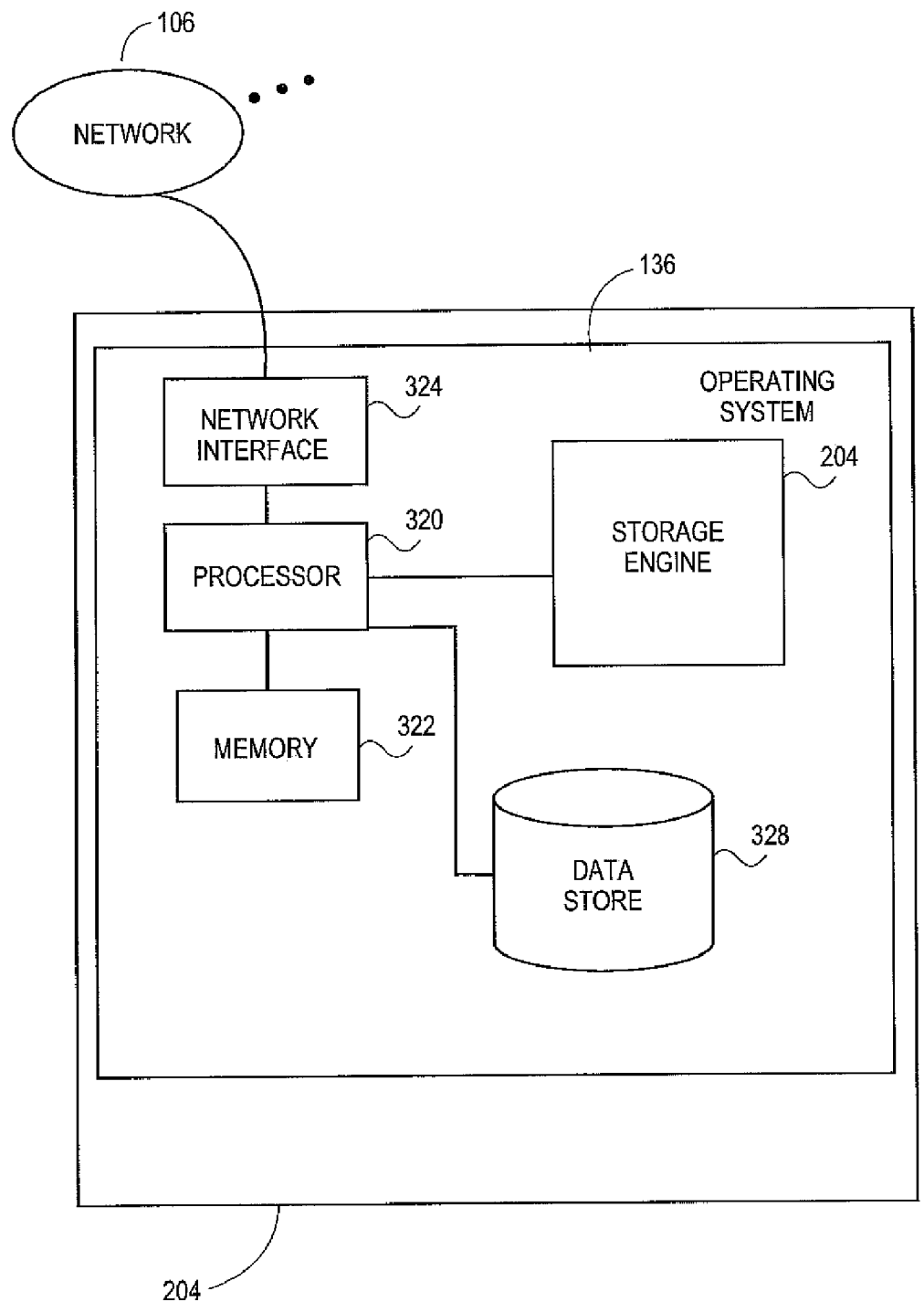
FIG. 4 illustrates an exemplary hardware configuration for a cloud management system, according to various embodiments.

FIG. 4 illustrates an exemplary diagram of hardware and other resources that can be incorporated in a source system 204 configured to communicate with set of remote storage hosts 210 via one or more networks 106, according to embodiments. In embodiments as shown, source system 204 can comprise a processor 130 communicating with memory 132, such as electronic random access memory, operating under control of or in conjunction with operating system 136. Operating system 136 can be, for example, a distribution of the Linux™ operating system, the Unix™ operating system, or other open-source or proprietary operating system or platform. Processor 130 also communicates with cloud store 138, such as a database stored on a local hard drive. Processor 130 further communicates with network interface 134, such as an Ethernet or wireless data connection, which in turn communicates with one or more networks 106, such as the Internet or other public or private networks. Processor 130 also communicates with could store 138 and management engine 128, to execute control logic and control the operation of virtual machines and other resources in cloud 102. Other configurations of source system 204, associated network connections, and other hardware and software resources are possible.

Figure 5:
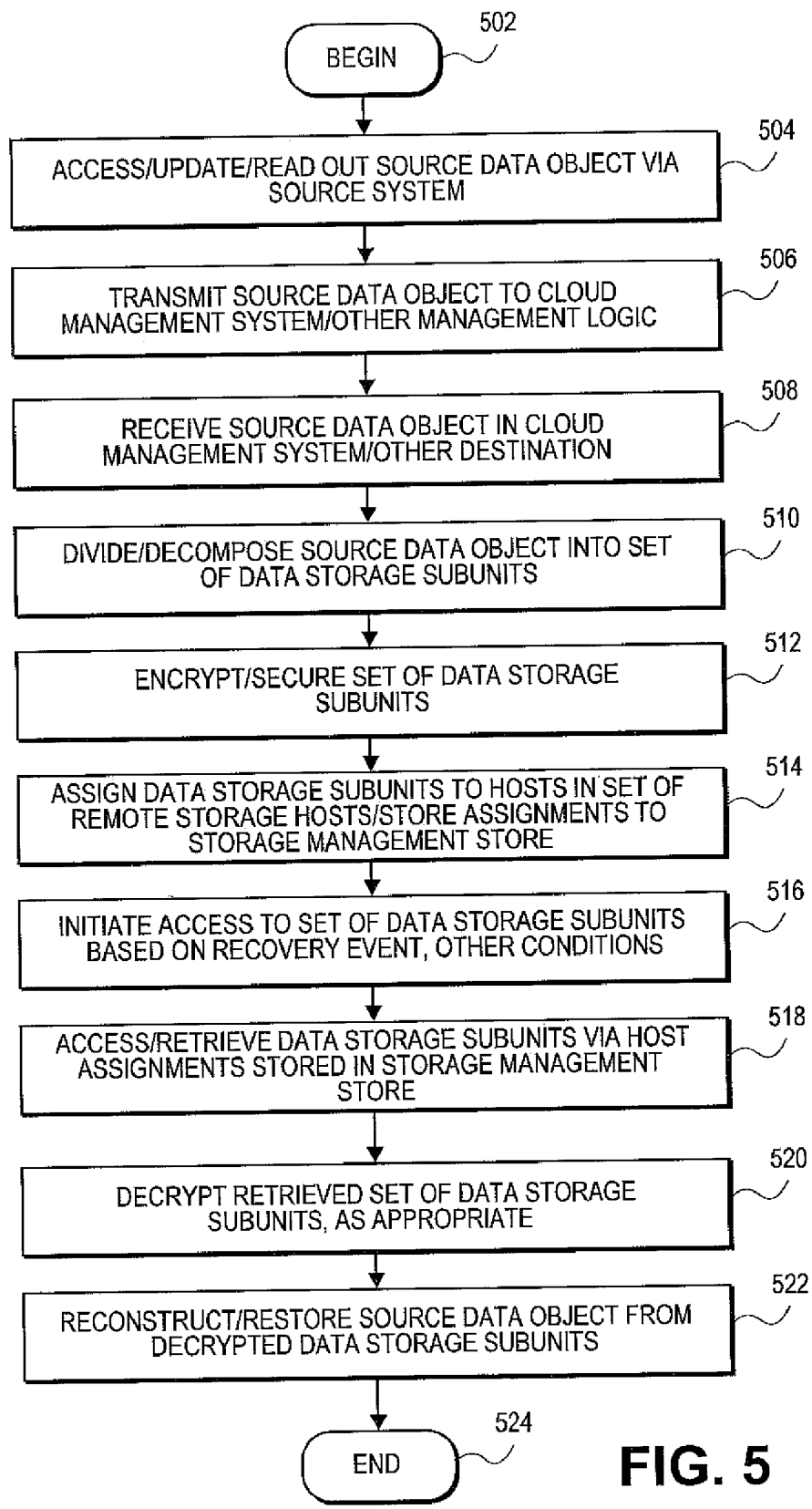
FIG. 5 illustrates a flowchart for overall storage, data processing, and recovery processing in a cloud computing environment, according to various embodiments.

FIG. 5 illustrates a flowchart of overall software diagnostic processing, according to various embodiments of the present teachings. In step 502, processing can begin. In step 504, source data object 212 can be accessed, updated, and/or read out via source system 204, such as by reading a file from a hard disk incorporated in source system 204. In 506, source data object 212 can be transmitted to cloud management system 104 or other management logic, for example using storage engine 216 of source system 204, or other logic. In 508, the source data object 212 can be received in cloud management system 104 and/or other destination. In 510, cloud management system 104 can divide or decompose source data object 212 into a set of data storage subunits 202, such as data blocks, datagrams, and/or other data units derived from source data object 212.

In 512, cloud management system 104 and/or other logic can encrypt or otherwise secure set of data storage subunits 202, for instance using encryption engine 214 to generate public/private key pairs, and/or using an authentication or certificate authority, as understood by persons skilled in the art. In embodiments, a password or challenge mechanism can also or instead be used. In 514, cloud management system 104 and/or other management logic can assign each data storage subunit in set of data storage subunits 202 to one or more hosts in set of remote storage hosts 210, and can store those assignments to storage management store 218 or other data store. In embodiments, the assignment or association of a data storage subunit to one or more host can be stored in a table, tree, and/or other record or format.

In 516, access to the set of data storage subunits 202 can be initiated based on a recovery event, and/or other conditions. For instance, source system 204 can detect a hard disk crash, virus intrusion, and/or other data fault or condition, and transmit a message to cloud management system 104 or other logic to request the recovery of source data object 212. In 516, set of data storage subunits 202 can be accessed and/or retrieved via corresponding hosts assignments stored in storage management store 218, and/or other retrieval mechanisms. In 520, cloud management system 104 or other logic can decrypt the retrieved set of data storage subunits 202, as appropriate. In 522, cloud management system 104 can reconstruct and/or restore source data object 212 from the decrypted set of storage subunits 202. In embodiments, cloud management system 104 or other logic or site can transmit the reconstructed source data object 212 to source system 204 or other destination. In step 524, as understood by persons skilled in the art, processing can repeat, return to a prior processing point, jump to a further processing point, or end.

The foregoing description is illustrative, and variations in configuration and implementation may occur to persons skilled in the art. For example, while embodiments have been described in which one source system 204 distributes one source data object 212 for secure storage in set of remote storage hosts 210, in embodiments, multiple source systems can transmit a source data object 212 to those hosts. Similarly, while embodiments have been described which involve the storage of one source data object 212, in embodiments, multiple data objects from a source system can be decomposed, secured and stored. Other resources described as singular or integrated can in embodiments be plural or distributed, and resources described as multiple or distributed can in embodiments be combined. The scope of the present teachings is accordingly intended to be limited only by the following claims.

What is claimed is:

1. A method comprising:
   decomposing, by a computer system, a virtual machine into a first storage subunit and a second storage subunit;
   encrypting, by the computer system, the first storage subunit and the second storage subunit;
   transmitting, by the computer system, the encrypted first storage subunit to a first storage host;
   transmitting, by the computer system, the encrypted second storage subunit to a second storage host;

storing, by the computer system, a record that associates the virtual machine with a first network location of the first remote storage host and a second network location of the second storage host;

receiving, by the computer system, a request for the virtual machine; and in response to the request:
- retrieving from the record, by the computer system, the first network location and the second network location,
- transmitting, by the computer system, a request to the first network location for the encrypted first storage subunit,
- transmitting, by the computer system, a request to the second network location for the encrypted second storage subunit,
- decrypting, by the computer system, the encrypted first storage subunit to obtain the first storage subunit,
- decrypting, by the computer system, the encrypted second storage subunit to obtain the second storage subunit, and
- reconstructing the virtual machine from the first storage subunit and the second storage subunit.

2. The method of claim 1, wherein the encryption comprises one or both of public key infrastructure encryption and private key encryption.

3. The method of claim 1, wherein the first storage host comprises at least one of a client computer, a server computer, a media playback device, or a wireless communications device.

4. The method of claim 1, wherein the record of the network location of the first storage host comprises a storage table that associates the first storage subunit with the first storage host.

5. The method of claim 1, wherein the first storage subunit comprises a file composed of equally sized data blocks.

6. The method of claim 1, wherein first storage subunit comprises file composed of unequally sized data blocks.

7. The method of claim 1, wherein the first storage host and the second storage host are managed via a cloud management system.

8. The method of claim 1, wherein the request for the virtual machine is in response to a recovery event.

9. A system comprising:
a network interface; and
a processor to:
- decompose the virtual machine into a first storage subunit and a second storage subunit,
- encrypt the first storage subunit and the second storage subunit,
- transmit, via the network interface, the encrypted first storage subunit to a first storage host,
- transmit, via the network interface, the encrypted second storage subunit to a second storage host,
- store a record that associates the virtual machine with a first network location of the first remote storage host and a second network location of the second storage host,
- retrieve the first network location and the second network location from the record,
- transmit, via the network interface, a request to the first network location for the encrypted first storage subunit,
- transmit, via the network interface, a request to the second network location for the encrypted second storage subunit,
- decrypt the encrypted first storage subunit to obtain the first storage subunit,
- decrypt the encrypted second storage subunit to obtain the second storage subunit, and
- reconstruct the virtual machine from the first storage subunit and the second storage subunit.

10. The system of claim 9, wherein the encryption comprises one or both of public key infrastructure encryption and private key encryption.

11. The system of claim 9, wherein the first storage host comprises at least one of a client computer, a server computer, a media playback device, or a wireless communications device.

12. The system of claim 9, wherein the first storage host and the second storage host are managed via a cloud management system.

13. A non-transitory computer readable storage medium embodying instructions that, when executed by a computer system, will cause the computer system to perform a method comprising:
- decomposing, by the computer system, a virtual machine into a first storage subunit and a second storage subunit;
- encrypting, by the computer system, the first storage subunit and the second storage subunit;
- transmitting, by the computer system, the encrypted first storage subunit to a first storage host;
- transmitting, by the computer system, the encrypted second storage subunit to a second storage host;
- storing, by the computer system, a record that associates the virtual machine with a first network location of the first remote storage host and a second network location of the second storage host;
- receiving, by the computer system, a request for the virtual machine; and
- in response to the request:
  - retrieving from the record, by the computer system, the first network location and the second network location,
  - transmitting, by the computer system, a request to the first network location for the encrypted first storage subunit,
  - transmitting, by the computer system, a request to the second network location for the encrypted second storage subunit,
  - decrypting, by the computer system, the encrypted first storage subunit to obtain the first storage subunit,
  - decrypting, by the computer system, the encrypted second storage subunit to obtain the second storage subunit, and
  - reconstructing the virtual machine from the first storage subunit and the second storage subunit.

14. The non-transitory computer readable storage medium of claim 13, wherein the encryption comprises one or both of public key infrastructure encryption and private key encryption.

15. The non-transitory computer readable storage medium of claim 13, wherein the first storage host comprises at least one of a client computer, a server computer, a media playback device, or a wireless communications device.

16. The non-transitory computer readable storage medium of claim 13, wherein the record of the network location of the first storage host comprises a storage table that associates the first storage subunit with the first storage host.

* * * * *